UNITED STATES PATENT OFFICE.

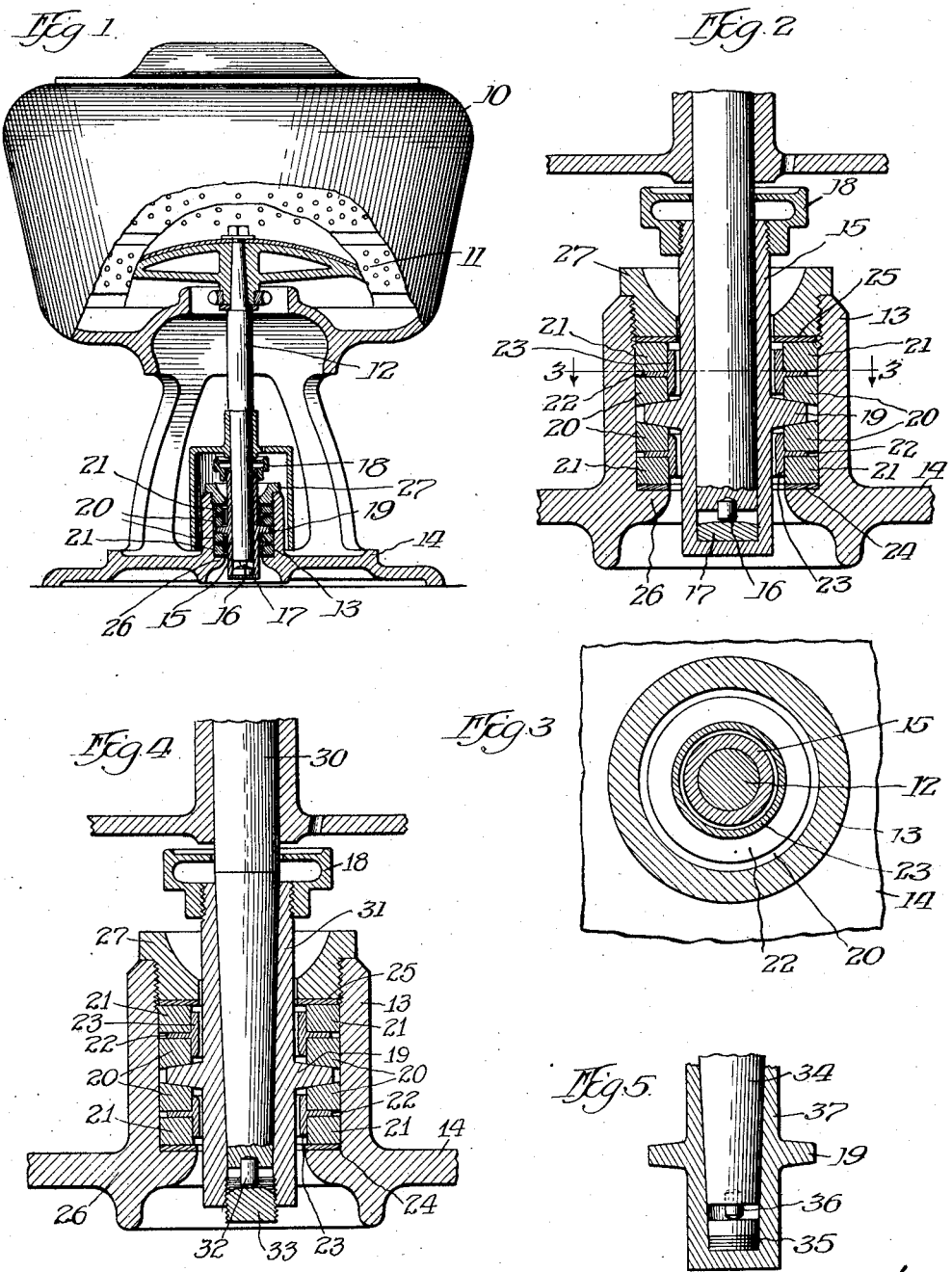

WILLIAM BARTHOLOMEW, OF CHICAGO, ILLINOIS, ASSIGNOR TO TROY LAUNDRY MACHINERY CO. LTD., OF CHICAGO, ILLINOIS, A CORPORATION OF NEW YORK.

CENTRIFUGAL-EXTRACTOR MECHANISM.

1,344,749.   Specification of Letters Patent.   Patented June 29, 1920.

Application filed June 25, 1917. Serial No. 176,772.

*To all whom it may concern:*

Be it known that I, WILLIAM BARTHOLOMEW, a citizen of the United States, and resident of Chicago, in the county of Cook and State of Illinois, have invented certain new and useful Improvements in Centrifugal-Extractor Mechanism, of which the following is a specification.

This invention relates to centrifugal extractors, and more particularly to spindle bearing mechanism therefor.

One of the objects of the invention is to maintain a relatively low bearing temperature.

Another object is to absorb gyratory motion of the spindle in a novel manner.

Another object of the invention is to provide spindle bearing mechanism for centrifugal extractors adapted to meet the requirements for successful commercial operation.

These and other objects are accomplished by providing in a centrifugal extractor the combination of a spindle, a bearing bushing therefor having a laterally extending flange, and bearing members operatively connected with the flange to take up gyratory motion and being spaced from the bearing bushing to maintain a low bearing temperature.

The invention is illustrated on the accompanying sheet of drawings in which,

Figure 1 is a side elevation, parts being in section of a centrifugal extractor embodying my invention;

Fig. 2 is an enlarged detail sectional view of the spindle bearing mechanism;

Fig. 3 is a sectional view taken in the plane of line 3—3 of Fig. 2;

Fig. 4 is an enlarged sectional view of spindle bearing mechanism which is a modification of the arrangement shown in Fig. 2, and, Fig. 5 is a detail sectional view of a spindle bearing showing modified means for adjusting the spindle in the bushing.

The various novel features of my invention will be apparent from the following description and drawings, and will be particularly pointed out in the appended claims.

My invention is illustrated in connection with a centrifugal hydro-extractor 10 having a perforated basket 11 secured to the upper end of a spindle 12, the lower end of which is mounted within a recessed portion 13 formed in the base 14 of the curb. The lower end of the spindle 12 rotates in a bearing bushing 15 and is provided with any suitable stepped bearing 16 having a curved surface rotating upon a stationary step 17 located in the bottom closed end of the bushing 15. The top of the bushing is provided with any suitable oiling device 18, and intermediate the ends of the bushing it has an integrally formed laterally extending annular flange 19, the upper and lower sides of which converge outwardly and engage coöperating bearing surfaces of bearing members 20. Each of the bearing members 20 which is in the form of a ring or annular piece of material, such as rubber or similar material, has a mating bearing member 21 which is spaced from its coöperating bearing member 20 by the laterally extending annular flange 22 of a metal ring 23. These metal rings, two in number, located between each pair of bearing members above and below the bushing flange 19, have an inside diameter sufficiently larger than the outside diameter of the bearing bushing 15 to permit gyratory motion of a considerable degree. At the same time the metal rings 23 prevent the bearing members 20 and 21 coming in contact with the bearing bushing 15, thereby providing means whereby currents of air may be circulated between the bearing bushing 15 and bearing members 20 and 21 and the ring supporting member 23 to maintain a relatively low bearing temperature. The bearing temperature also is maintained relatively low, due to the fact that eight bearing surfaces are provided, said bearing surfaces being between the bearing members 20 and 21 and the interposed metal rings 23, between the intermediate bearing members 20 and the bushing flange 19 and between the outer bearing members 21 and the washers or spacing members 24 and 25. The spacing member 24 rests on an annular shoulder 26 formed on the base of the curb and the spacer 25 rests upon the upper bearing member 21 and is pressed into engagement therewith by lock nut 27. The pressure exerted upon the bearing members may be regulated by adjusting the lock nut 27 with respect to the base of the curb.

By means of this arrangement it is apparent that any gyratory motion of the spindle will be taken up by the eight surfaces which materially aid in maintaining a low bearing temperature. A further advantage, in this arrangement, where rubber or similar material is used for the bearing members, is that sufficient space is provided to allow this material, which is not compressible, to change its form but maintain its volume under pressure.

In Fig. 4 I have disclosed a combination which has a spindle bearing arrangement which is similar to the one disclosed in Figs. 1 and 2, with the exception, however, that the spindle 30 is tapered at its lower end and the bearing bushing 31 is correspondingly tapered. The lower end of the spindle 30 is provided with any suitable step bearing 32 which rests upon a bushing step 33 which is adjustable with respect to the bushing 31 to take up wear.

In Fig. 5 I have shown a further modification in which the spindle 34 may be adjusted in accordance with the wear by means of shims 35 placed beneath the step 36 and retained by the closed end of the bearing bushing 37.

It is evident that there may be further modifications of the invention, and it is my intention to cover all such modifications which do not involve a departure from the spirit and scope of the invention as set forth in the following claims.

I claim:

1. In a centrifugal extractor, the combination of a spindle, a bearing bushing therefor having a laterally extending flange, bearing members operatively connected to the flange to take up gyratory motion and being spaced from the bearing bushing to maintain a low bearing temperature, and a member for maintaining the spaced relationship of said bearing members and the bearing bushing.

2. In a centrifugal extractor, the combination of a spindle having a tapered portion, a bearing bushing having a tapered portion for directly receiving the spindle and having a laterally extending flange, bearing members operatively connected with the flange which permit and also take up gyratory motion, and means for spacing said bearing members from said bushing and maintaining the spaced relationship for maintaining low bearing temperature.

3. In a centrifugal extractor, the combination of a spindle, a bearing bushing therefor having a laterally extending flange, and a set of bearing members on each side of said flange which permit and also take up gyratory motion, each of said sets including a plurality of members, and means for spacing said members from the bearing bushing.

4. In a centrifugal extractor, the combination of a spindle, a bearing bushing therefor having a laterally extending flange, and a set of bearing members on each side of said flange which permit and also take up gyratory motion, each of said sets including a plurality of members, and means for spacing said members from each other and from said bearing bushing.

5. In a centrifugal extractor, the combination of a spindle, a bearing bushing therefor having a laterally extending flange, and bearing means on each side of said flange, one of said bearing means including a plurality of members and a retaining member for preventing engagement between said members and the bearing bushing.

6. In a centrifugal extractor, the combination of a spindle, a bearing bushing therefor having a laterally extending flange, and bearing means on each side of said flange for taking up gyratory motion, said means including annular members, and a ring having a flange for separating said annular members and being spaced from the bearing bushing to permit circulation of air therebetween.

Signed at Chicago, Illinois, this 20th day of June, 1917.

WILLIAM BARTHOLOMEW.

Witnesses:
J. F. REUSTLE,
S. H. DEKKER.